(12) United States Patent
Carpenter

(10) Patent No.: US 12,329,270 B1
(45) Date of Patent: Jun. 17, 2025

(54) COMBINATION BACKPACK AND QUIVER

(71) Applicant: Joseph Todd Carpenter, Brentwood, TN (US)

(72) Inventor: Joseph Todd Carpenter, Brentwood, TN (US)

(*) Notice: Subject to any disclaimer, the term of this patent is extended or adjusted under 35 U.S.C. 154(b) by 283 days.

(21) Appl. No.: 18/194,625

(22) Filed: Apr. 1, 2023

(51) Int. Cl.
| | |
|---|---|
| *A45F 3/04* | (2006.01) |
| *A01M 31/02* | (2006.01) |
| *F41B 5/06* | (2006.01) |
| *A45F 3/00* | (2006.01) |

(52) U.S. Cl.
CPC ............. *A45F 3/04* (2013.01); *A01M 31/025* (2013.01); *F41B 5/063* (2013.01); *A45F 2003/003* (2013.01)

(58) Field of Classification Search
CPC .... A45F 3/04; F41B 5/063; F41B 5/06; F41B 5/1457
USPC .......................................................... 224/576
See application file for complete search history.

(56) References Cited

U.S. PATENT DOCUMENTS

| | | | | |
|---|---|---|---|---|
| 2,587,155 | A * | 2/1952 | Harvey | F41B 5/063 |
| | | | | 124/25.7 |
| 2,722,958 | A * | 11/1955 | King | F41B 5/063 |
| | | | | 224/916 |
| 2,744,348 | A | 5/1956 | Smith | |
| 2,771,620 | A * | 11/1956 | Hoffman | F41B 5/063 |
| | | | | 206/315.11 |
| 2,781,808 | A * | 2/1957 | Barnard | F41B 5/063 |
| | | | | 124/25.7 |
| 2,881,817 | A * | 4/1959 | Brion | F41B 5/063 |
| | | | | 124/25.7 |
| 2,897,864 | A * | 8/1959 | Schmidt | F41B 5/063 |
| | | | | 124/25.7 |
| 3,465,928 | A * | 9/1969 | Osterholm | F41B 5/063 |
| | | | | 124/25.7 |

(Continued)

FOREIGN PATENT DOCUMENTS

DE     202017003099 U1     10/2017

OTHER PUBLICATIONS

Safari Tuff ArrowMaster Quiver, website print out from ArrowMaster Quiver—Safari Tuff (undated but admitted to be prior art)(2 pages).

(Continued)

*Primary Examiner* — Nathan J Newhouse
*Assistant Examiner* — Lester L Vanterpool
(74) *Attorney, Agent, or Firm* — Lucian Wayne Beavers; Patterson Intellectual Property Law PC

(57) ABSTRACT

A combination backpack and quiver apparatus includes a backpack, a quiver, a planar insert and first and second quiver mounting rods. The planar insert is received in an outer pocket of the backpack. The insert includes a plurality of elongated quiver mounting receptacles extending substantially parallel to an insert length, the quiver mounting receptacles being spaced apart across an insert width. The quiver includes a hood, first and second elongated quiver rails extending from the hood, and at least one resilient arrow holder mounted on the rails and including a plurality of laterally open arrow receiving recesses defined in the resilient arrow holder. The first and second quiver mounting rods are received in first and second ones of the quiver mounting receptacles and are attached to the at least one resilient arrow holder to mount the quiver on the backpack.

15 Claims, 8 Drawing Sheets

(56) References Cited

U.S. PATENT DOCUMENTS

| | | | | |
|---|---|---|---|---|
| 3,696,978 | A | * | 10/1972 | Gentellalli ............... F41B 5/063 124/25.7 |
| 4,073,328 | A | * | 2/1978 | Franklin ................. F41B 5/063 124/25.7 |
| 5,199,621 | A | | 4/1993 | Mclennan |
| 5,791,537 | A | * | 8/1998 | Miller ....................... A45F 3/06 224/628 |
| 5,871,133 | A | | 2/1999 | Robinson |
| 5,961,017 | A | * | 10/1999 | Mehler ................... F41B 5/063 224/582 |
| 6,217,113 | B1 | | 4/2001 | Knatz |
| 6,290,114 | B1 | * | 9/2001 | Berberian ................. A45F 3/04 224/916 |
| 6,672,299 | B2 | | 1/2004 | Proctor |
| 7,735,701 | B2 | * | 6/2010 | Eberle ....................... A45F 3/04 224/916 |
| 8,714,147 | B2 | * | 5/2014 | Walk ....................... F41B 5/066 224/916 |
| 8,839,773 | B2 | | 9/2014 | Ellig |
| 8,870,045 | B1 | * | 10/2014 | Aguirre ..................... A45F 3/04 224/582 |
| 8,931,469 | B2 | * | 1/2015 | Kingsbury .............. F41B 5/066 124/88 |
| 9,074,840 | B2 | * | 7/2015 | Andersen ................ F41C 33/06 |
| D807,026 | S | | 1/2018 | Lawhorn |
| 10,034,468 | B1 | | 7/2018 | Pitts |
| 10,591,243 | B2 | * | 3/2020 | Houle ...................... F41B 5/066 |
| 11,026,501 | B1 | * | 6/2021 | Dabrowka ................ F41H 1/02 |
| 11,953,284 | B2 | * | 4/2024 | Davis ...................... F41B 5/066 |
| 2004/0159691 | A1 | * | 8/2004 | Dingman .................. A45F 3/04 224/656 |
| 2009/0151709 | A1 | * | 6/2009 | Tilby ....................... F41B 5/063 124/44.5 |
| 2011/0180575 | A1 | * | 7/2011 | Abramowitz ............. A45F 3/04 224/259 |
| 2019/0212637 | A1 | * | 7/2019 | D'Acquisto ........ A01M 31/002 |

OTHER PUBLICATIONS

Insights Hunting ISH9100, website print out from ISH9100—The Vision Bow Pack—Insights Outdoors (undated but admitted to be prior art)(3 pages).

Academy Magellan Outdoors Bow Pack, website print out from Magellan Outdoors Bow Pack | Academy (undated but admitted to be prior art)(3 pages).

Keyes 3D Quiver Pack, website print out from 3D Quiver Pack—Keyes Hunting Gear (undated but admitted to be prior art)(3 pages).

Hunting Giant Horn Hunter G2 Daypack Mossy Oak Infinity, website print out from Hunting Daypack | Horn Hunter G2 Daypack—Hunting Giant (undated but admitted to be prior art)(3 pages).

* cited by examiner

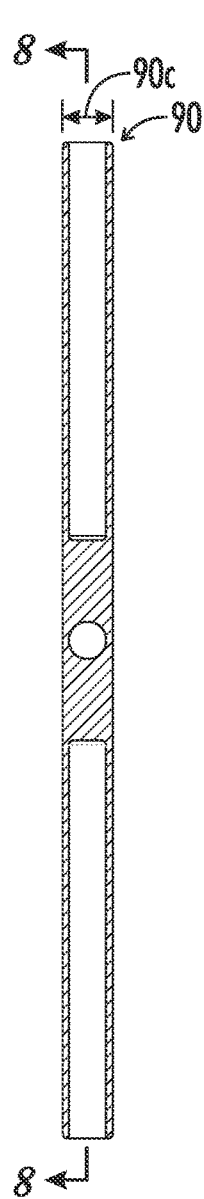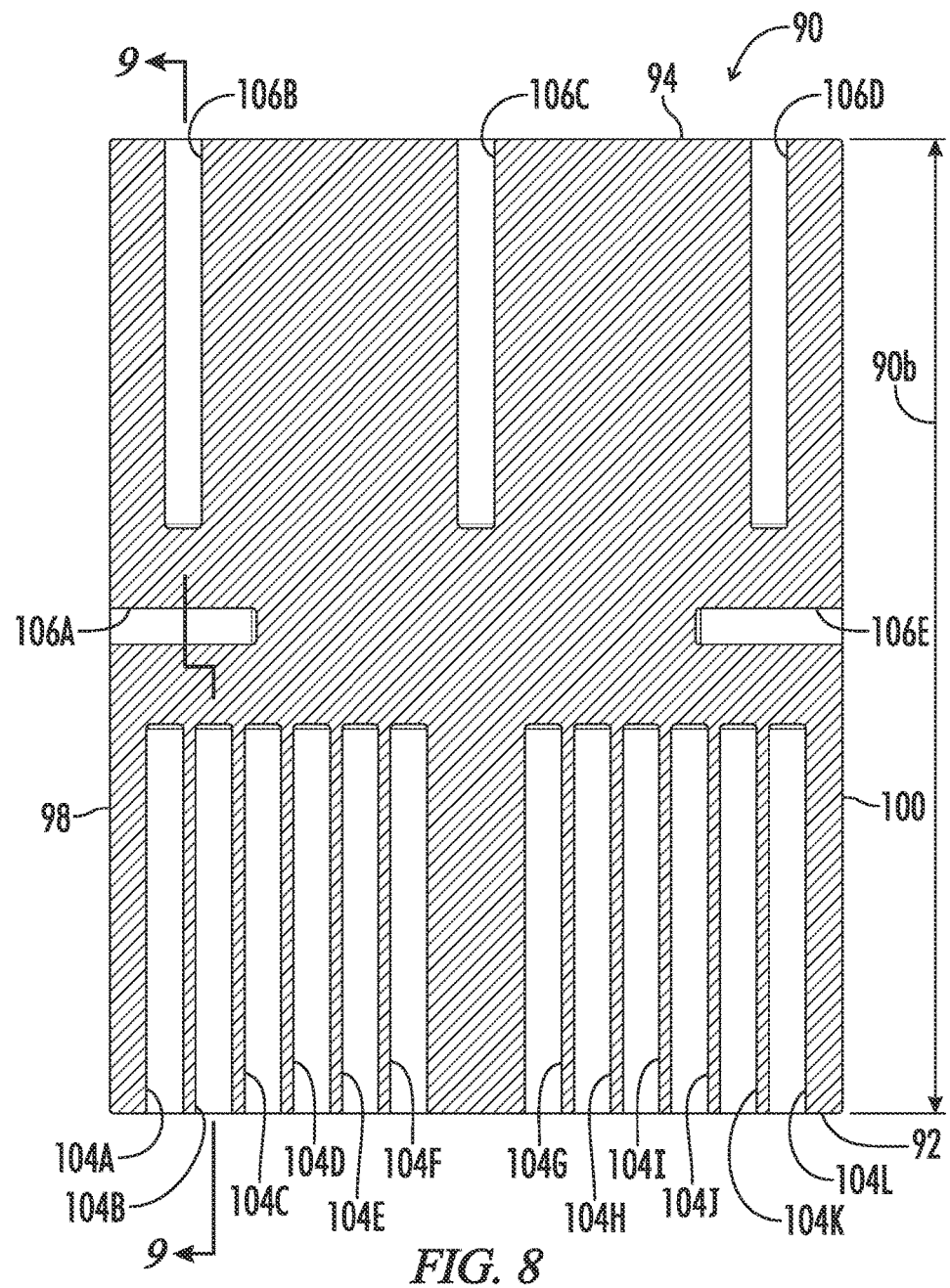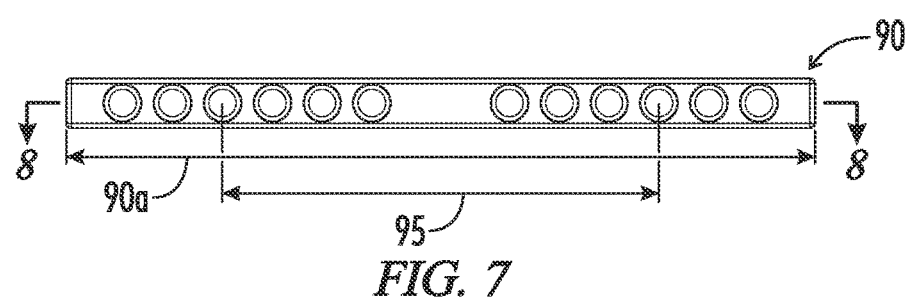
FIG. 9
FIG. 8
FIG. 7

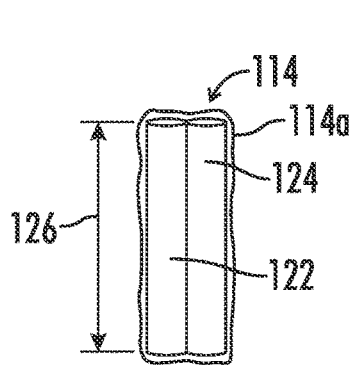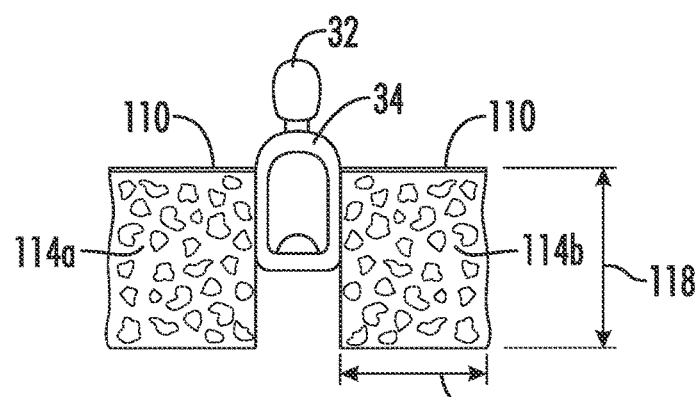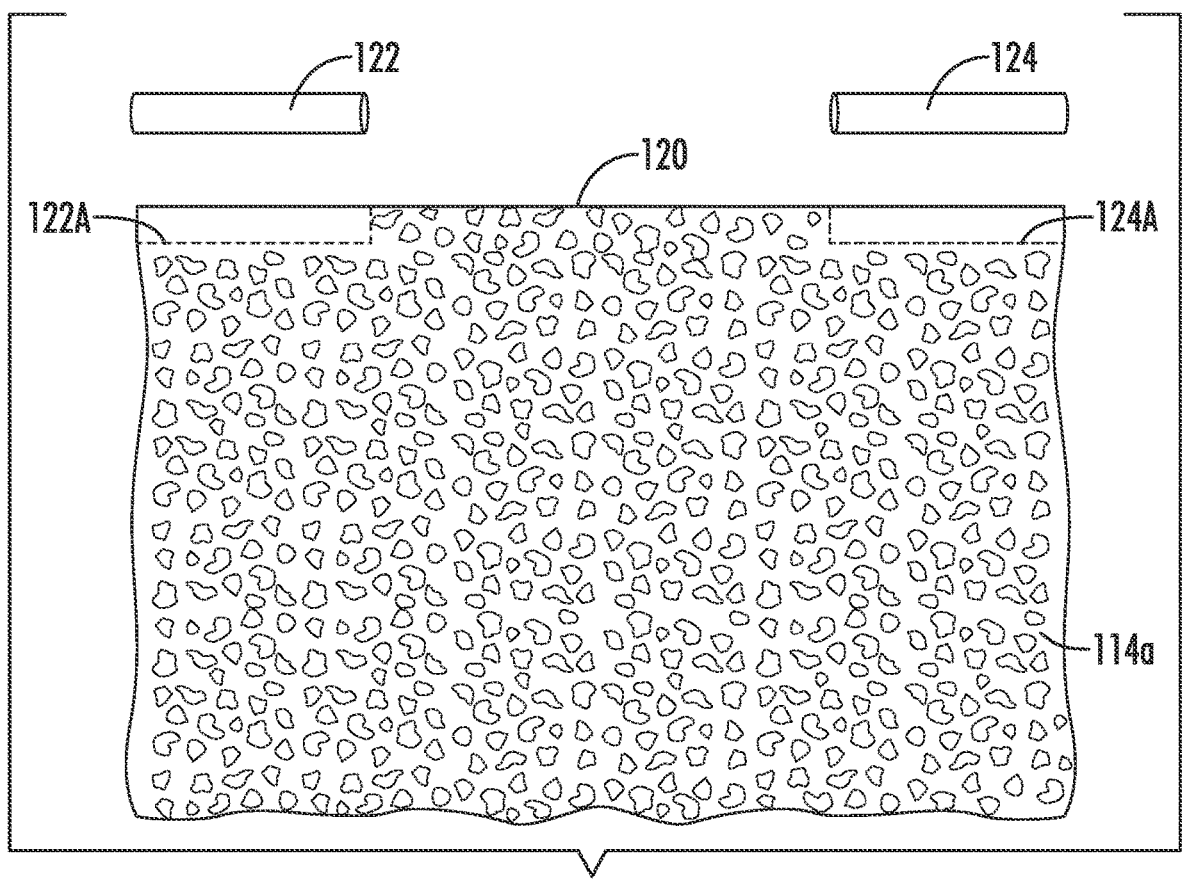

COMBINATION BACKPACK AND QUIVER

BACKGROUND OF THE INVENTION

1. Field of the Invention

The present application relates to a combination backpack and quiver, and to an adapter configured to permit a backpack and a quiver to be combined. An accessory in the form of a portable blind is also disclosed.

2. Description of the Prior Art

One problem encountered by bow hunters is the need to carry a lot of hunting gear, including a plurality of arrows. The arrows need to be quickly accessible when the opportunity arises for taking a shot, yet the arrows and particularly the fletching of the arrows needs to be protected from physical damage and from rain.

Currently no suitable solution is available. Hunters often just stuff their quiver into an opening on their backpack. Also a separate enclosed arrow container in the form of a large tube may be carried on a sling.

There is a need for improved systems for addressing this problem.

SUMMARY OF THE INVENTION

In one embodiment a combination backpack and quiver apparatus includes a backpack, a quiver, a planar insert and first and second quiver mounting rods. The backpack includes a relatively thinner outer pocket and a relatively thicker interior space, the outer pocket having an open pocket end. The planar insert is received in the outer pocket through the open pocket end, the planar insert has a first insert end and a second insert end and an insert length from the first insert end to the second insert end, the insert including two lateral edges extending from the first insert end to the second insert end. The insert has an insert width between the two lateral edges. The insert includes a plurality of elongated quiver mounting receptacles defined in the insert and extending substantially parallel to the insert length, the quiver mounting receptacles being open at the first insert end and the quiver mounting receptacles being spaced across the insert width. The quiver includes a hood, first and second elongated quiver rails extending from the hood, and at least one resilient arrow holder mounted on the rails and including a plurality of laterally open arrow receiving recesses defined in the resilient arrow holder. The first and second quiver mounting rods are received in first and second ones of the quiver mounting receptacles and extend out of the open pocket end, the quiver being mounted on the quiver mounting rods such that the hood is spaced from the back pack and the quiver rails extend toward the back pack, such that an arrow may have an arrow head received in the hood and an arrow shaft laterally received in one of the laterally open arrow receiving recesses with an arrow fletching end of the arrow received in the interior space of the backpack.

In another embodiment a backpack insert apparatus for mounting a quiver to a backpack includes a planar insert having a first insert end and a second insert end and an insert length from the first insert end to the second insert end. The planar insert includes two lateral edges extending from the first insert end to the second insert end. The insert has an insert width between the two lateral edges and the insert includes a plurality of elongated quiver mounting receptacles defined in the insert and extending substantially parallel to the insert length, the quiver mounting receptacles being open at the first insert end and the quiver mounting receptacles being spaced across the insert width. The insert includes at least one accessory mounting receptacle defined in the planar insert, the at least one accessory mounting receptacle being open at either the second insert end or one of the lateral edges of the planar insert.

In still another embodiment a portable hunting blind apparatus includes a backpack, left and right support rods attached to the backpack and extending laterally to a left side and a right side of the backpack, and left and right curtains of flexible material configured to hang downward from the left and right support rods, each curtain having a lateral width of at least 1 foot and a vertical length of at least 2 feet.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 7 is a bottom end view of one embodiment of the adapter insert.

FIG. 8 is an elevation sectioned view of the adapter insert of FIG. 7, taken along line 8-8 of FIG. 7.

FIG. 9 is an elevation section view of the adapter insert of FIGS. 7 and 8, taken along line 9-9 of FIG. 8.

FIG. 13 is a schematic rear elevation view of an accessory in the form of a hunting blind attached to the backpack.

FIG. 14 schematically shows the one curtain of the hunting blind of FIG. 13 in an exploded unfurled position.

FIG. 15 schematically shows the hunting blind of FIG. 13 in a collapsed compact packed position.

DETAILED DESCRIPTION

Figure 1:
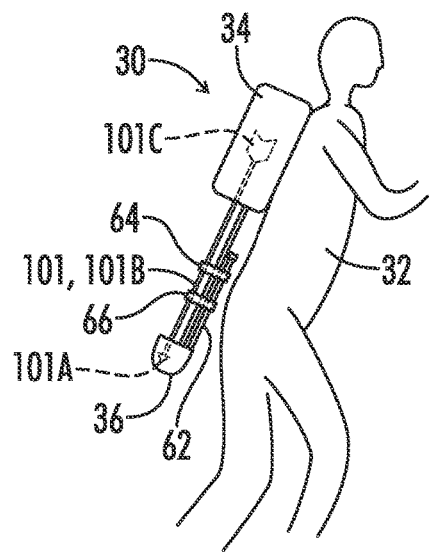
FIG. 1 schematically illustrates a hunter carrying the combination backpack and quiver apparatus of the present disclosure.

Referring now to FIG. 1, a combination backpack and quiver apparatus 30 is shown being carried on the back of a hunter 32. The combination backpack and quiver apparatus 30 includes a backpack 34 and a quiver 36. In this view the apparatus 30 is being worn with the quiver 36 extending downward away from the backpack 34. It will be understood that the combination backpack and quiver apparatus 30 could be worn in any other desired orientation. For example, the backpack 34 could be oriented with the quiver 36 extending upward from the backpack 34.

Figure 2:
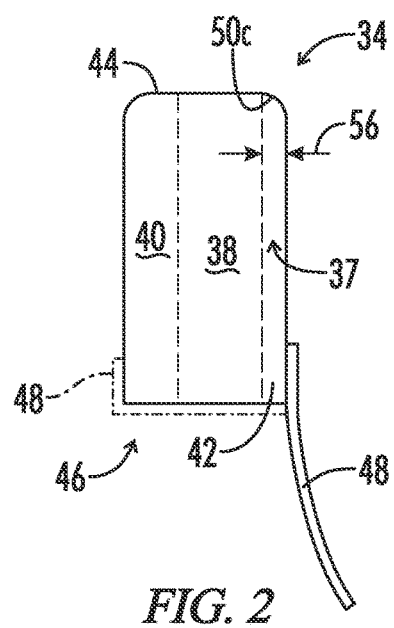
FIG. 2 is a schematic side elevation view of the backpack of FIG. 1 showing the various pockets and interior divisions of the backpack.

The backpack 34 is schematically shown in a side elevation view in FIG. 2 and may include a relatively thinner forward outer pocket 37 and a relatively thicker interior space 38. The backpack may include other compartments such as a rear outer compartment 40. The forward outer pocket 37 may have an open pocket end 42 which in FIG. 2 faces downwardly. In the orientation of FIG. 2 the backpack 34 has a closed upper end 44 and an open lower end 46. The open lower end 46 may be closed by a flexible flap 48 which is shown in solid lines in an open position and in dashed lines in a closed position.

Figure 3:
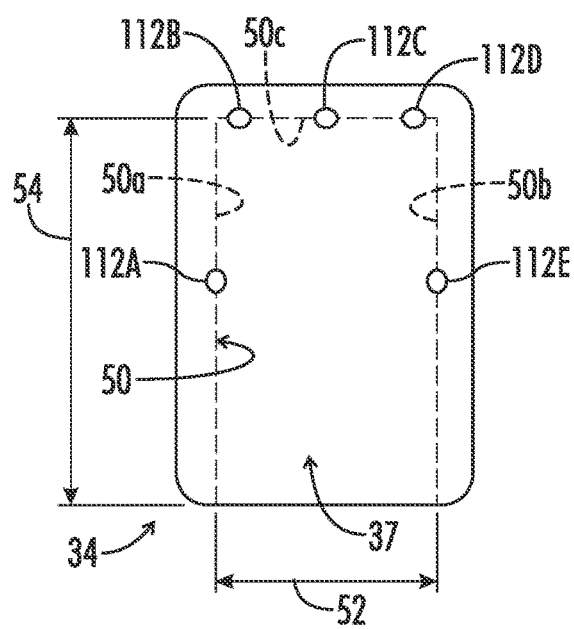
FIG. 3 is a schematic front elevation view of the backpack of FIG. 2 showing an inner perimeter of a forward outer pocket in dash lines.

FIG. 3 schematically shows in dash lines an inner perimeter 50 of the relatively thinner forward outer pocket 37. The inner perimeter 50 may include first internal lateral edge 50a, second internal lateral edge 50b and an internal end 50c of the inner perimeter 50. The outer pocket 37 may for example be a pocket such as is often used to receive a thin planar object such as a tablet computer or the like. The pocket 37 may have a pocket width 52, a pocket length 54 and a pocket thickness 56. In one embodiment the pocket width 52 may be a range of from about 7 to about 8 inches, and preferably about 7.5 inches. The pocket length 54 may be 90b in a range of from about 8 to about 10 inches, and preferably about 8.75 inches. The pocket thickness 56 when expanded may be at least about 0.5 inch and preferably in a range of from about 0.7 to 0.8 inch. The thickness of the relatively thicker interior space 38 as seen in FIG. 2 may be in a range of from about 1 inch to about 3 inches when the backpack is expanded as shown I FIG. 2.

Figure 4:
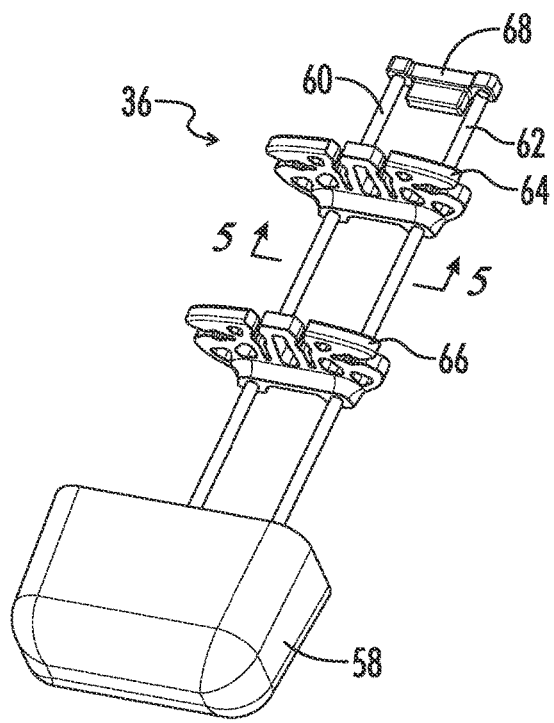
FIG. 4 is a perspective view of the quiver of FIG. 1.
Figure 5:
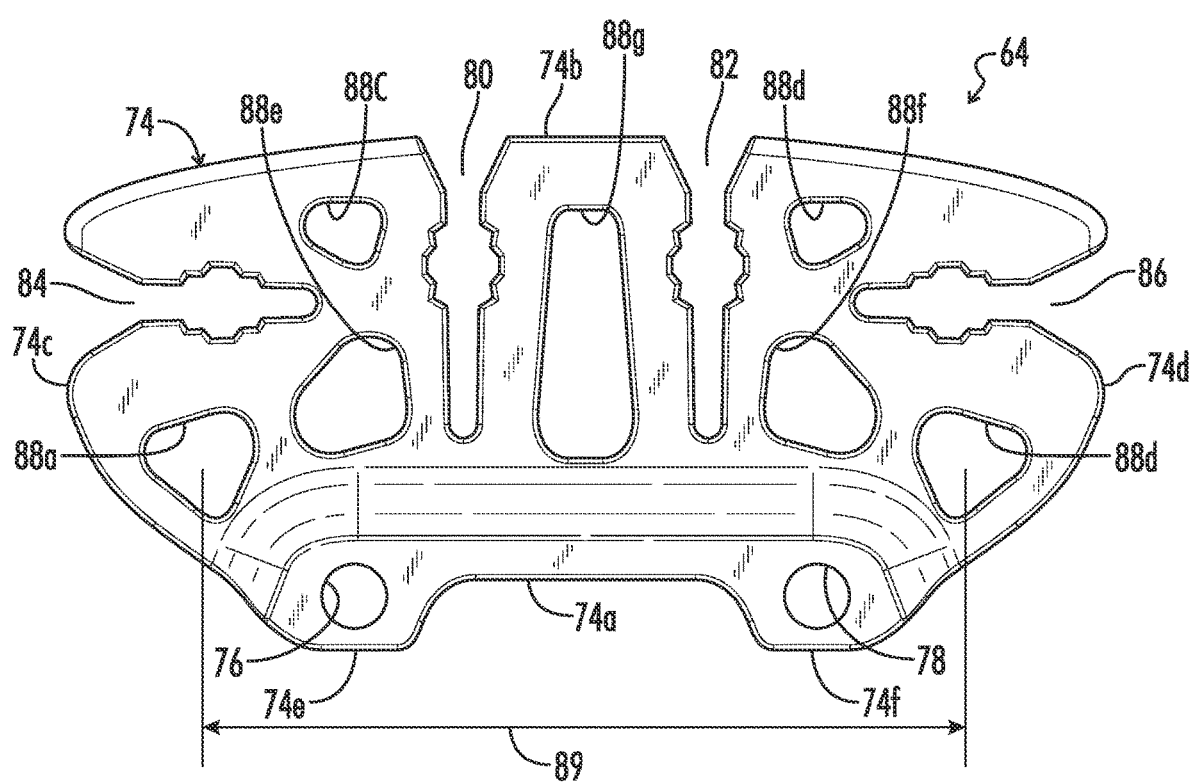
FIG. 5 is an elevation view of one of the resilient arrow holders taken along line 5-5 of FIG. 4.

Details of the quiver 36 are shown in FIGS. 4 and 5. The quiver 36 includes a hood 58, first and second elongated quiver rails 60 and 62 extending from the hood 58, and first and second resilient arrow holders 64 and 66 mounted on the rails 60, 62. The lower ends of the quiver rails 60 and 62 may be attached to the hood 58 and the upper ends may be attached to a rail bracket 68. The quiver 36 may for example be constructed in accordance with the teachings of U.S. Pat. No. 6,672,299, the details of which are incorporated herein by reference.

FIG. 5 shows the details of construction of one example of the first resilient arrow holder 64. The second resilient arrow holder 66 may be identical. The arrow holder 64 may be formed of a relatively hard rubber material and may be formed with a plurality of openings for the mounting of the quiver rails 64, 66, for receiving arrows, and for receiving first and second quiver mounting rods 70 and 72. As shown in FIG. 5 the arrow holder 64 has an outer perimeter 74 in an irregular shape. The outer perimeter 74 may include a forward perimeter face 74a, a rearward perimeter face 74b, and lateral perimeter faces 74c and 74d. The forward perimeter face 74a may include forward protrusions 74e and 74f. First and second rail receiving holes 76 and 78 may be formed through the protrusions 74e and 74f for slidably but snugly receiving the first and second quiver rails 60 and 62 therethrough.

Rearward face 74b may have first and second arrow receiving slots 80 and 82 formed therein. First and second side faces 74c and 74d may have third and fourth arrow receiving slots 84 and 86, respectively, formed therein. The arrow receiving slots 80, 82, 84, 86 may also be referred to as laterally open arrow receiving recesses 80, 82, 84, 86. Arrow holder 64 may have a plurality of expansion openings 88a, 88b, 88c, 88d, 88e, 88f and 88g formed therein. When the quiver 36 is not attached to the quiver mounting rods 70 and 72 all of the expansion openings 88a-88g may provide additional lateral flexibility to the resilient arrow holder 64 to allow the arrow receiving slots 80, 82, 84, 86 sufficient flexibility so that an arrow shaft may be laterally placed within each of the slots. In the embodiment shown, the expansion openings 88a, 88b, 88c and 88d are circular openings and the expansion openings 88e, 88f and 88g are irregular shaped openings.

The circular expansion openings 88a and 88b may also be used to receive the quiver mounting rods 70 and 72 to attach the quiver 36, and particularly the first and second arrow holders 64 and 66, to the backpack 34, as is further described below.

Figure 6:
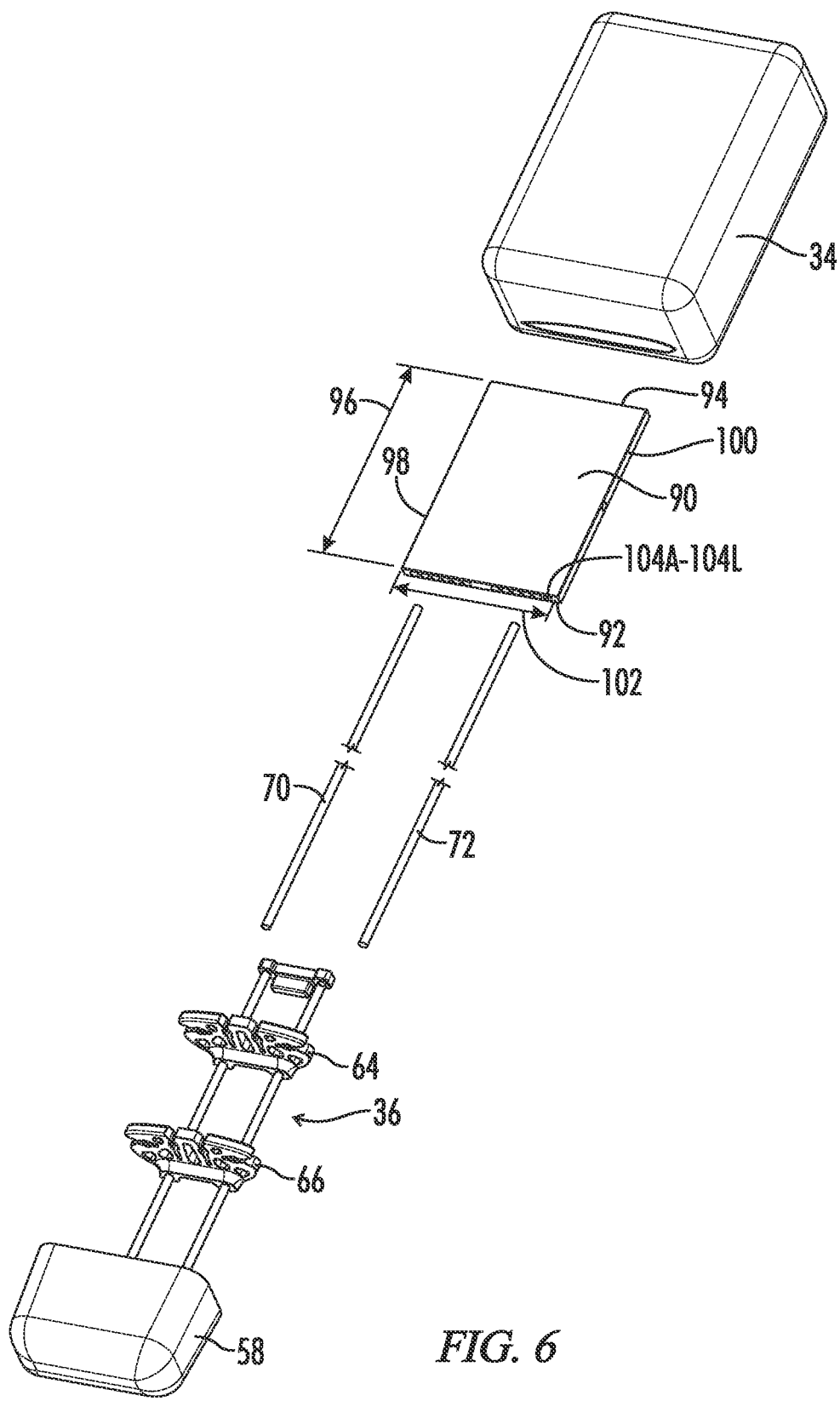
FIG. 6 is an exploded view of the backpack, an adapter insert, first and second quiver mounting rods, and the quiver.

As schematically shown in the exploded view of FIG. 6 the quiver 36 may be mounted on the backpack 34 using the quiver mounting rods 70 and 72 and an adapter insert 90. The adapter insert 90 may be a planar insert received in the outer pocket 37 through the open pocket end 42. The planar insert 90 may have a first insert end 92 and a second insert end 94 and an insert length 96 from the first insert end 92 to the second insert end 94. The insert 90 may include two lateral edges 98 and 100 extending from the first insert end 92 to the second insert end 94. The insert 90 may have an insert width 102 between the two lateral edges 98 and 100. The insert 90 may include a plurality of elongated quiver mounting receptacles 104A-104L defined in the insert 90 and extending substantially parallel to the insert length 96.

As is further described below with regard to FIGS. 7-9, the quiver mounting receptacles 104A-104L may be formed as blind bores open at the first insert end 92. The quiver mounting receptacles are spaced apart across the insert width 102, which allows any two of the quiver mounting receptacles which are spaced apart at a suitable distance to be selected to receive the quiver mounting rods 70 and 72 at a suitable spacing so that the quiver mounting rods 70 and 72 can also be received through the holes 88a and 88b of the arrow holders 64 and 66.

In the embodiment of the arrow holders 64 and 66 seen in FIG. 5 the first and second holes 88a and 88b of each of the at least two resilient arrow holders 64 and 66, through which the quiver mounting rods 70 and 72 are received, are located in a lateral direction between the quiver rails 60 and 62 and the laterally open arrow receiving recesses 80, 82, 84 and 86. In this manner arrows may be laterally received in or removed from the laterally open arrow receiving recesses 80, 82, 84 and 86 without interference from either the quiver rails 60, 62 or the quiver mounting rods 70, 72.

In one embodiment the entire combination backpack and quiver apparatus 30 may be provided to the hunter 32 as an assembly. But the insert 90 also allows the hunter to customize the assembly by selecting a quiver 36 of the hunter's choice and/or attaching the quiver to a backpack 34 of the hunter's choice using the planar insert 90 as an adapter to assemble the combination backpack and quiver. It is noted that the first and second holes 88*a* and 88*b* of each of the at least two resilient arrow holders 64, 66 are spaced apart by a hole spacing 89. The hunter may select first and second ones of the quiver mounting receptacles 104A-104L to receive the quiver mounting rods 70 and 72 such that the selected receptacles are spaced apart in a direction of the insert width 92 by a receptacle spacing 95 (see FIG. 7) most nearly equal to the hole spacing 89 of any of the available receptacle pairs of receptacles 104A-104L.

In one embodiment as seen in FIGS. 7-9, the planar insert 90 may be formed from a block of polymeric material and the quiver mounting receptacles 104A-104L may be formed as drilled holes in the polymeric material. The drilled holes for blind bores in the insert 90.

Figure 10:
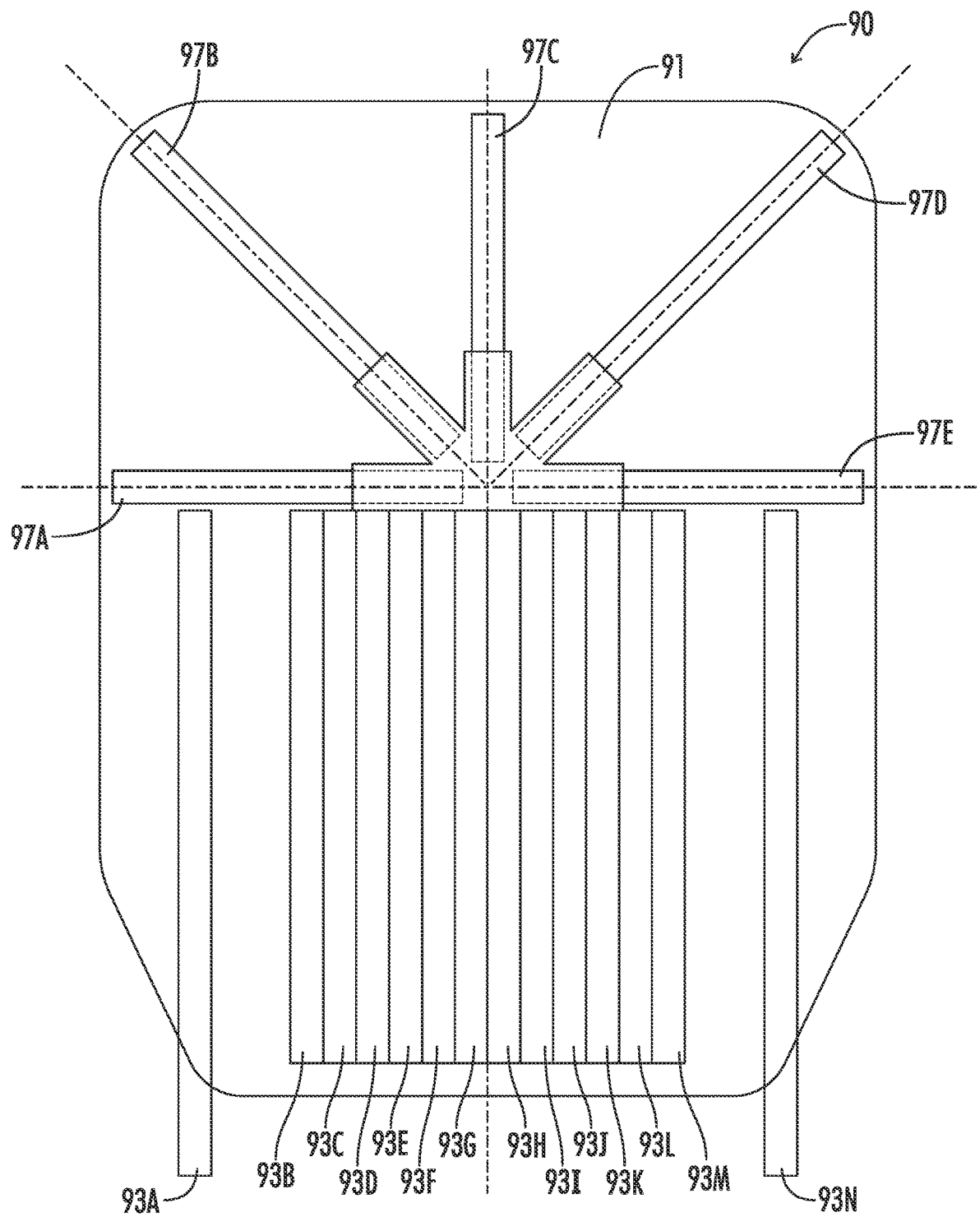
FIG. 10 is a rear elevation view of a second embodiment of the adapter insert.

In a second embodiment as shown in FIG. 10 the planar insert 90 may be formed from one or more sheets of backing material 91 and the quiver mounting receptacles 104 are formed as the interiors of cylindrical tubes 93A-93N attached to the one or more sheets 91 of backing material. The tubes 93A-93H may each be received in and adhered to shallow grooves formed in the backing sheet 91. The backing material may for example be a sheet of polypropylene cutting board or similar material. The tubes 93A-93H may be aluminum tubes. As seen in FIG. 10 the lower corners of the sheet of backing material 91 may be tapered to conform to the shape of the backpack 34. The planar insert 90 of FIG. 10 may also include accessory mounting tubes 97A-97E.

When the backpack 34 and the quiver 36 are assembled using the quiver mounting rods 70 and 72 and the planer insert 90, the first and second quiver mounting rods 70 and 72 are received in first and second ones of the quiver mounting receptacles 104A-104L and extend out of the open pocket end 42. The quiver 36 is mounted on the quiver mounting rods 70 and 72 such that the hood 58 is spaced from the back pack 34 and the quiver rails 60 and 62 extend from the hood 58 toward the back pack 34, such that an arrow101 may have an arrow head 101A received in the hood 58 and an arrow shaft 101B laterally received in one of the laterally open arrow receiving recesses 80, 82, 84, 86 with an arrow fletching end 101C of the arrow 101 received in the interior space 38 of the backpack 34 as schematically shown in FIG. 1.

In an embodiment the planar insert 90 may be snugly received in the outer pocket 37 with the two lateral edges 98 and 100 of the planar insert 90 received against internal lateral edges 50*a* and 50*c*, respectively, of the outer pocket 37 and with the second insert end 94 received against an internal end 50*c* of the outer pocket 37. The planar insert 90 may have an insert width 90*a* in a range of from about 7 to about 8 inches, and preferably about 7.5 inches. The planar insert 90 may have an insert length 90*b* in a range of from about 8 to about 10 inches, and preferably about 8.75 inches. The planar insert 90 may have an insert thickness 90*c* of at least about 0.5 inch and preferably in a range of from about 0.7 to 0.8 inch. Other dimensions may be selected depending upon the dimensions of the pocket 37.

In addition to the quiver mounting rod receptacles 104A-104L, the planar insert 90 may include at least one accessory mounting receptacle 106A-106E defined in the planar insert 90. The at least one accessory mounting receptacle 106A-106E may be open at either the second insert end 94 or one of the lateral edges 98 or 100 of the planar insert 90. In the embodiment shown in FIG. 8 accessory mounting receptacle 106A is open at lateral edge 98, accessory mounting receptacles 106B-D are open at second end 94, and accessory mounting receptacle 106E is open at second lateral edge 100. The accessory mounting receptacles 106A-E allow various accessories to be mounted on the backpack 34 with accessory mounting rods extending upward or laterally to either side from the hunter 32.

Similarly in the embodiment of FIG. 10, accessory mounting tubes 108A-108E provide for mounting of accessories.

In either embodiment the planar insert 90 may be described as including at least three accessory mounting receptacles, there being at least one of the accessory mounting receptacles open to each of the second insert end 94 and the two lateral edges 98 and 100 of the planar insert 90.

The backpack 34 may include one or more accessory mounting openings 112 formed in the backpack and associated with each accessory mounting receptacle when the planar insert 90 is received in the outer pocket 37. Thus for example as seen in FIG. 3, when using the planar insert 90 the fabric of the backpack 34 may have accessory mounting openings 112A-112E formed therethrough communicating the interior of pocket 37 with the exterior of the backpack 34.

One or more accessories may be mounted on the backpack 34 with one or more accessory mounting rods 110 received in selected accessory mounting receptacles 106A-106E or accessory mounting tubes 108A-108E. The accessory may be selected from the group consisting of a flag, a sign bearing legible indicia, an umbrella, a light, a camera holder, a headlamp, a bow holder, and a hunting blind. Other accessories may also be mounted.

FIG. 13 shows a schematic rear elevation view of an accessory in the form of a portable hunting blind 114 attached to the backpack 34 using two accessory mounting rods 110 received in the accessory mounting receptacles 106A and 106E. The left and right accessory mounting rods 110 extend laterally to a left side and a right side of the backpack 34, and left and right curtains 114*a* and 114*b* of flexible material hang downward from the left and right mounting rods 110. The curtains may have a camouflage pattern printed thereon. Each curtain 114*a* and 114*b* may have a lateral width 116 and a vertical length 118. The lateral width 116 may be at least 1 foot, preferably at least 1.5 foot, and more preferably about 2 feet. The vertical length 118 may be at least two feet, preferably at least 3 feet, and more preferably about 4 feet.

As seen in FIG. 14, each of the curtains 114*a* and 114*b* may have an upper edge 120 and may include laterally inner and outer reinforcing tubes 122 and 124 attached to the curtain in pockets 122A and 124A formed adjacent laterally inner and outer ends of the upper edge 120. The reinforcing tubes 122 and 124 may receive an associated one of the mounting rods 110 therethrough.

As seen in FIG. 15, the portable blind 114 may be folded up into a small package having a package length 126 only slightly longer than a length of the reinforcing tubes 122 and 124 which may be placed side by side with the fabric material of the curtains 114*a* and 114*b* folded or wrapped around them. This allows the portable hunting blind 114 to be compactly packed away, for example in the backpack 34, when not in use.

Figure 16:
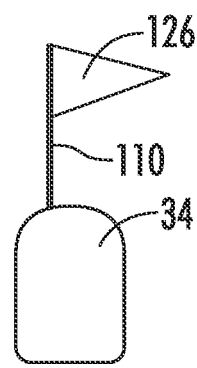
FIG. 16 is a schematic rear elevation view of an accessory in the form of a flag attached to the backpack.

FIG. 16 is a schematic rear elevation view of an accessory in the form of a flag 128 attached to the backpack 34 by one accessory mounting rod 110 which may be received in any of the upwardly facing accessory mounting receptacles 106B, 106C or 106D.

Figure 17:
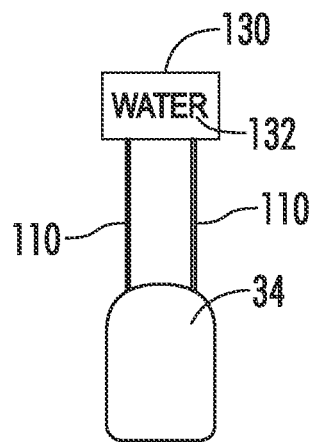
FIG. 17 is a schematic rear elevation view of an accessory in the form of a sign bearing legible indicia attached to the backpack.

FIG. 17 is a schematic rear elevation view of an accessory in the form of a sign 130 bearing legible indicia 132. Sign 130 may be attached to the backpack 34 with two accessory mounting rods 110 received in any two of the upwardly facing accessory mounting receptacles 106B, 106C or 106D.

Figure 18:
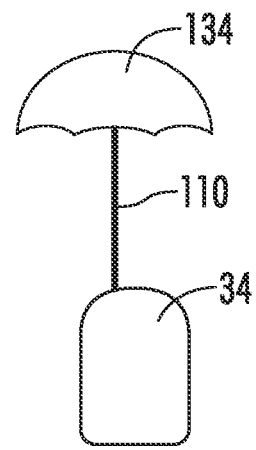
FIG. 18 is a schematic rear elevation view of an accessory in the form of an umbrella attached to the backpack.

FIG. 18 is a schematic rear elevation view of an accessory in the form of an umbrella 134 which may be attached to the backpack 34 by one accessory mounting rod 110 which may be received in any of the upwardly facing accessory mounting receptacles 106B, 106C or 106D.

Figure 19:
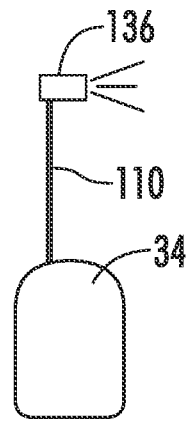
FIG. 19 is a schematic rear elevation view of an accessory in the form of a headlamp or other type of light attached to the backpack.

FIG. 19 is a schematic rear elevation view of an accessory in the form of a headlamp 136 or other type of light which may be attached to the backpack 34 by one accessory mounting rod 110 which may be received in any of the upwardly facing accessory mounting receptacles 106B, 106C or 106D.

Figure 20:
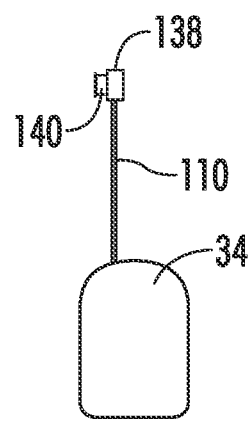
FIG. 20 is a schematic rear elevation view of an accessory in the form of a camera holder attached to the backpack.

FIG. 20 is a schematic rear elevation view of an accessory in the form of a camera holder 138 attached to the backpack 34 for holding a camera 140. The camera holder 138 may be attached to the backpack 34 by one accessory mounting rod 110 which may be received in any of the upwardly facing accessory mounting receptacles 106B, 106C or 106D.

Figure 21:
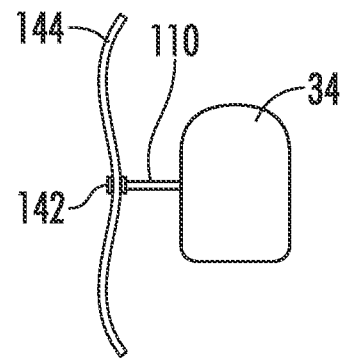
FIG. 21 is a schematic rear elevation view of an accessory in the form of a bow holder attached to the backpack.

FIG. 21 is a schematic rear elevation view of an accessory in the form of a bow holder 142 for holding a bow 144. The bow holder 142 may be attached to the backpack 34 by an accessory mounting rod 110 mounted in one of the laterally opening mounting receptacles 106A or 106E.

The accessory mounting rods 110 and the quiver mounting rods 70 and 72 may be formed as tubular cylindrical shafts of the same material and same dimensions as typical arrow shafts. For example, the accessory mounting rods 110 and the quiver mounting rods 70 and 72 may be formed as hollow aluminum shafts having an outside diameter in a range of $9/32$ to $5/16$ inch.

Figure 11:
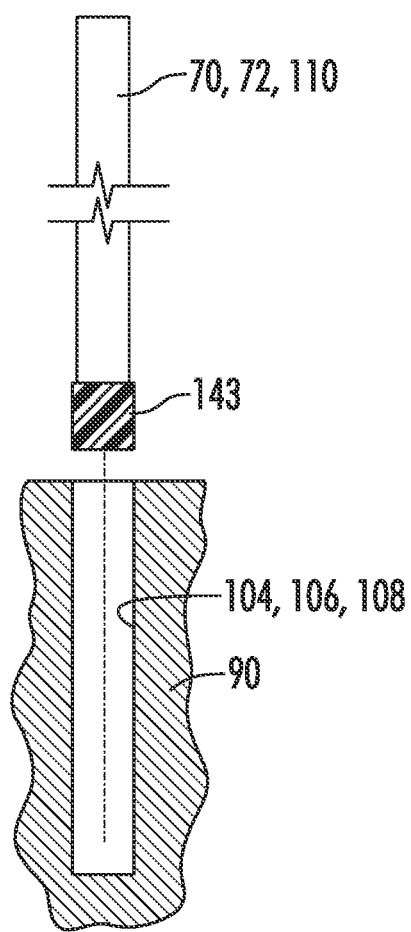
FIG. 11 is a schematic exploded elevation view of one embodiment of a rod end and receptacle connection using a friction fit.

The interconnections between the accessory mounting rods 110 or the quiver mounting rods 70 and 72 and the various receptacles 104A-104L or 106A-106E may be formed in any suitable fashion. One example of such a connection is schematically shown in FIG. 11 which is a schematic exploded elevation view of one embodiment of a rod end and receptacle connection using a friction fit. As seen in FIG. 11 the rod 70, 72 or 110 may have an enlarged resilient plug 143 attached thereto. The plug 143 is dimensioned to slide into the receptacle 104, 106 or 108 with a snug sliding fit.

Figure 12:
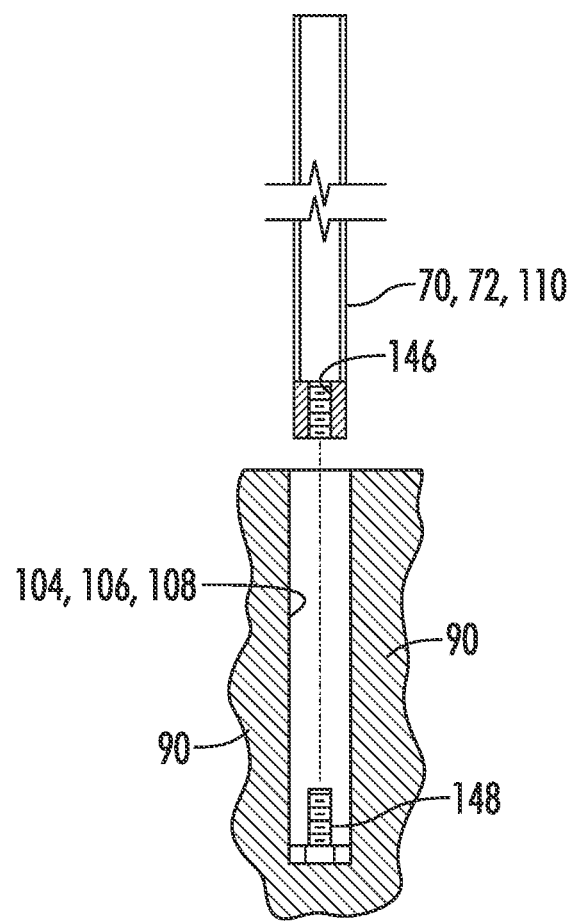
FIG. 12 is a schematic exploded elevation view of another embodiment of a rod end and receptacle connection using a threaded connection.

FIG. 12 shows another type of connection which provides a threaded interconnection between the selected rod 70, 72, 110 and the receptacle 104, 106, 108. For example the receptacle may have a male threaded shaft 148 secured in its blind end and the rod may have a corresponding female thread 146 formed in its distal end which is received in the receptacle. The rod may be inserted into the receptacle and then rotated to make up a threaded connection between the threaded members 148 and 146. The threaded female connection 146 on the end of the rod may for example be the same type of threaded connection used to attach an arrowhead to an arrow shaft.

Each of the receptacles 104A-104L and 106A-106E may be described as a cylindrical receptacle having a diameter in a range of from 0.35 to 0.40 inch and having a length in a range of from about 2 to about 5 inches. The receptacles 104A-104L may have a receptacle length of about 4.0 inches. The accessory mounting receptacles 106A-106E may have a receptacle length of about 3.0 inches.

The combination backpack and quiver apparatus 30 disclosed herein provides many advantages over the prior art. The quiver 36 is easily attached to or removed from the backpack 34. Protection is provided for the fletching end 101C of the arrows 101. Accessories can be attached to the backpack.

Multiple quivers may be attached to the backpack in side by side fashion across the width of the backpack.

The quiver mounting tube receptacles can be used for receiving "field point" type arrow heads when the hunter is engaged in target practice.

Accessories can be supported vertically, horizontally or at an angle.

The adapter insert 90 can be used with many types of existing backpacks including hydration packs, day packs, Bino packs, camera bags, fishing bags and tactical bags. Most existing quiver designs can be supported from any selected backpack type simply by appropriate sizing of the adapter insert 90.

Thus, it is seen that the present disclosure achieves the ends and advantages mentioned as well as those inherent therein. Numerous changes in the arrangement and construction of the disclosed structures may be made by those skilled in the art, which changes are encompassed within the scope of the present invention as defined by the appended claims.

What is claimed is:

1. A combination backpack and quiver apparatus, comprising:
    a backpack including a relatively thinner outer pocket and a relatively thicker interior space, the outer pocket having an open pocket end;
    a planar insert received in the outer pocket through the open pocket end, the planar insert having a first insert end and a second insert end and an insert length from the first insert end to the second insert end, the insert including two lateral edges extending from the first insert end to the second insert end, the insert having an insert width between the two lateral edges, the insert including a plurality of elongated quiver mounting receptacles defined in the insert and extending parallel to the insert length, the quiver mounting receptacles being open at the first insert end and the quiver mounting receptacles being spaced across the insert width;
    a quiver including a hood, first and second elongated quiver rails extending from the hood, and at least one resilient arrow holder mounted on the rails and including a plurality of laterally open arrow receiving recesses defined in the resilient arrow holder; and
    first and second quiver mounting rods received in first and second ones of the quiver mounting receptacles and extending out of the open pocket end, the quiver being mounted on the quiver mounting rods such that the hood is spaced from the back pack and the quiver rails extend toward the back pack, such that an arrow may have an arrow head received in the hood and an arrow shaft laterally received in one of the laterally open arrow receiving recesses with an arrow fletching end of the arrow received in the interior space of the backpack.

2. The apparatus of claim 1, wherein:
    the planar insert is snugly received in the outer pocket with the two lateral edges of the planar insert received against internal lateral edges of the outer pocket and with the second insert end received against an internal end of the outer pocket.

3. The apparatus of claim 1, wherein:
    the quiver mounting receptacles are formed as blind bores in the planar insert.

4. The apparatus of claim 1, wherein:
    the at least one resilient arrow holder includes at least two resilient arrow holders spaced apart along a length of the quiver rails, each of the at least two resilient arrow holders having first and second holes therethrough; and the first and second quiver mounting rods are received through the first and second holes, respectively, of each of the at least two resilient arrow holders.

5. The apparatus of claim 4, wherein:
the first and second holes of each of the at least two resilient arrow holders are located in a lateral direction between the quiver rails and the laterally open arrow receiving recesses.

6. The apparatus of claim 4, wherein:
the first and second holes of each of the at least two resilient arrow holders are spaced apart by a hole spacing; and
the first and second ones of the quiver mounting receptacles are selected such that the selected receptacles are spaced apart in a direction of the insert width by a receptacle spacing most nearly equal to the hole spacing of any of the receptacle pairs.

7. The apparatus of claim 1, wherein:
the planar insert includes at least one accessory mounting receptacle defined in the planar insert, the at least one accessory mounting receptacle being open at either the second insert end or one of the lateral edges of the planar insert.

8. The apparatus of claim 7, wherein:
the backpack has an accessory mounting opening formed in the backpack and associated with each accessory mounting receptacle when the planar insert is received in the outer pocket.

9. The apparatus of claim 8, further comprising:
at least one accessory mounting rod received in one of the accessory mounting receptacles and extending through the associated accessory mounting opening.

10. The apparatus of claim 9, further comprising:
at least one accessory attached to the at least one accessory mounting rod, the accessory being selected from the group consisting of a flag, a sign bearing legible indicia, an umbrella, a light, a camera holder, a headlamp, a bow holder, and a hunting blind.

11. The apparatus of claim 7, wherein:
the at least one accessory mounting receptacle includes at least three accessory mounting receptacles, there being at least one of the accessory mounting receptacles open to each of the second insert end and the two lateral edges of the planar insert.

12. The apparatus of claim 7, wherein:
the at least one accessory mounting receptacle includes left and right laterally oriented mounting receptacles; and
the apparatus further includes a portable blind including left and right accessory mounting rods configured to be attached to the left and right laterally oriented mounting receptacles such that the left and right accessory mounting rods extend laterally to a left side and a right side of the backpack, and left and right curtains of flexible material configured to hang downward from the left and right accessory mounting rods, each curtain having a lateral width of at least 1 foot and a vertical length of at least two feet.

13. The apparatus of claim 12, wherein:
each of the curtains has an upper edge and includes laterally inner and outer reinforcing tubes attached to the curtain adjacent laterally inner and outer ends of the upper edge, the reinforcing tubes receiving an associated one of the support rods therethrough.

14. The apparatus of claim 1, wherein:
the planar insert is formed from a block of polymeric material and the quiver mounting receptacles are formed as drilled holes in the polymeric material.

15. The apparatus of claim 1, wherein:
the planar insert is formed from one or more sheets of backing material and the quiver mounting receptacles are formed as cylindrical tubes attached to the one or more sheets of backing material.

\* \* \* \* \*